United States Patent
Takara et al.

(10) Patent No.: US 9,834,202 B2
(45) Date of Patent: Dec. 5, 2017

(54) HYBRID VEHICLE

(71) Applicant: TOYOTA JIDOSHA KABUSHIKI KAISHA, Toyota-shi, Aichi-ken (JP)

(72) Inventors: Atsushi Takara, Miyoshi (JP); Kiyoshiro Ueoka, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/003,926

(22) Filed: Jan. 22, 2016

(65) Prior Publication Data

US 2016/0214602 A1   Jul. 28, 2016

(30) Foreign Application Priority Data

Jan. 27, 2015   (JP) .................. 2015-013217

(51) Int. Cl.
| | | |
|---|---|---|
| *B60W 20/00* | (2016.01) | |
| *B60W 20/40* | (2016.01) | |
| *B60W 10/06* | (2006.01) | |
| *B60W 10/08* | (2006.01) | |
| *B60K 6/445* | (2007.10) | |

(52) U.S. Cl.
CPC .............. *B60W 20/40* (2013.01); *B60K 6/445* (2013.01); *B60W 10/06* (2013.01); *B60W 10/08* (2013.01); *Y02T 10/54* (2013.01); *Y02T 10/6239* (2013.01); *Y02T 10/6286* (2013.01); *Y10S 903/93* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,380,006 | A * | 5/1921 | Nielsen ................. | F16H 15/503 475/189 |
| 5,006,093 | A * | 4/1991 | Itoh ................... | F16H 61/66259 474/28 |
| 5,355,749 | A * | 10/1994 | Obara .................... | B60K 6/543 477/15 |
| 5,722,502 | A * | 3/1998 | Kubo ..................... | B60K 6/442 180/65.23 |
| 6,053,833 | A * | 4/2000 | Masaki .................. | B60K 6/445 475/2 |
| 6,119,800 | A * | 9/2000 | McComber .............. | B60K 1/00 180/65.1 |
| 6,311,113 | B1 * | 10/2001 | Danz ................. | F16H 61/66259 474/28 |

(Continued)

FOREIGN PATENT DOCUMENTS

| | | |
|---|---|---|
| CN | 101196144 A | 6/2008 |
| JP | 2013-189046 | 9/2013 |

*Primary Examiner* — Jonathan L Sample
(74) *Attorney, Agent, or Firm* — Finnegan, Henderson, Farabow, Garrett & Dunner, LLP (57) ABSTRACT

When an EV cancellation switch is turned on while a control mode is a CD mode and a traveling mode is an EV traveling mode, when a catalyst temperature is lower than a threshold and when a vehicle speed is lower than a threshold, a controller executes control processing including a step of executing first VVT control, a step of, when the catalyst temperature is higher than or equal to the threshold or when the vehicle speed is higher than or equal to the threshold, executing second VVT control and a step of switching the control mode into a CS mode.

3 Claims, 6 Drawing Sheets

(56) References Cited

U.S. PATENT DOCUMENTS

| | | | |
|---|---|---|---|
| 6,358,174 B1* | 3/2002 | Folsom | F16H 47/04 475/72 |
| 6,514,175 B2* | 2/2003 | Taniguchi | F16H 61/0021 477/138 |
| 6,721,637 B2* | 4/2004 | Abe | B60K 6/48 180/65.8 |
| 7,011,600 B2* | 3/2006 | Miller | B62M 9/08 476/36 |
| 7,234,873 B2* | 6/2007 | Kato | F16C 13/006 384/463 |
| 7,574,935 B2* | 8/2009 | Rohs | F16H 15/42 474/83 |
| 7,584,020 B2* | 9/2009 | Bruemmer | G06N 3/008 318/567 |
| 7,909,727 B2* | 3/2011 | Smithson | F16H 15/28 476/36 |
| 7,976,426 B2* | 7/2011 | Smithson | F16H 15/28 476/38 |
| 8,167,759 B2* | 5/2012 | Pohl | F02B 67/04 180/53.8 |
| 8,171,636 B2* | 5/2012 | Smithson | F16H 15/28 29/893 |
| 8,321,097 B2* | 11/2012 | Vasiliotis | B62M 11/16 180/207.1 |
| 8,360,917 B2* | 1/2013 | Nichols | B62M 11/16 475/189 |
| 8,682,550 B2* | 3/2014 | Nelson | F16H 63/50 180/170 |
| 8,725,339 B2* | 5/2014 | Justin | B60W 10/26 180/65.21 |
| 9,283,954 B2* | 3/2016 | Dalum | H01M 16/006 |
| 9,493,150 B2* | 11/2016 | Endo | B60K 6/46 |
| 2001/0008192 A1* | 7/2001 | Morisawa | B60K 6/46 180/197 |
| 2001/0044361 A1* | 11/2001 | Taniguchi | F16H 61/0021 477/111 |
| 2002/0169051 A1* | 11/2002 | Oshidari | F16H 61/0025 476/10 |
| 2003/0015358 A1* | 1/2003 | Abe | B60K 6/48 180/65.25 |
| 2003/0015874 A1* | 1/2003 | Abe | B60K 6/48 290/40 C |
| 2004/0193363 A1* | 9/2004 | Schmidt | A01B 69/007 701/23 |
| 2005/0113202 A1* | 5/2005 | Miller | B62D 5/0409 475/215 |
| 2006/0108956 A1* | 5/2006 | Clark | B60L 3/108 318/139 |
| 2006/0180363 A1* | 8/2006 | Uchisasai | B60K 6/48 180/65.275 |
| 2006/0231306 A1* | 10/2006 | Severinsky | B60H 1/004 180/65.23 |
| 2007/0004556 A1* | 1/2007 | Rohs | F16H 15/42 477/130 |
| 2007/0205028 A1* | 9/2007 | Leone | B60K 6/445 180/65.28 |
| 2008/0081728 A1* | 4/2008 | Faulring | F16H 15/40 476/40 |
| 2008/0110439 A1* | 5/2008 | Sugimoto | F02D 13/0203 123/478 |
| 2008/0276892 A1* | 11/2008 | Doljack | F02N 11/0866 123/179.28 |
| 2009/0101421 A1* | 4/2009 | Oyobe | B60K 6/26 180/65.29 |
| 2009/0306843 A1* | 12/2009 | Jinno | B60K 6/44 701/22 |
| 2010/0019729 A1* | 1/2010 | Kaita | B60L 11/123 320/134 |
| 2010/0056322 A1* | 3/2010 | Thomassy | F16H 15/28 476/39 |
| 2010/0131164 A1* | 5/2010 | Carter | B60L 11/1805 701/61 |
| 2010/0145560 A1* | 6/2010 | Komatsu | B60K 6/365 701/22 |
| 2010/0191372 A1* | 7/2010 | Nihei | B25J 9/1676 700/245 |
| 2011/0114403 A1* | 5/2011 | Hauger | B60K 6/387 180/65.25 |
| 2011/0184614 A1* | 7/2011 | Keilers | B60W 10/08 701/54 |
| 2011/0257823 A1* | 10/2011 | Watanabe | B60K 6/445 701/22 |
| 2011/0295456 A1* | 12/2011 | Yamamoto | B60K 6/445 701/22 |
| 2012/0035015 A1* | 2/2012 | Ogawa | F16H 3/12 475/186 |
| 2012/0072062 A1* | 3/2012 | Ando | B60K 6/365 701/22 |
| 2012/0150374 A1* | 6/2012 | Yamazaki | B60K 6/445 701/22 |
| 2012/0238386 A1* | 9/2012 | Pohl | F02B 67/04 475/115 |
| 2012/0258839 A1* | 10/2012 | Smithson | B60H 1/3222 477/42 |
| 2012/0277946 A1* | 11/2012 | Yamamoto | B60K 6/445 701/22 |
| 2012/0309579 A1* | 12/2012 | Miller | B62M 9/08 475/189 |
| 2013/0096764 A1* | 4/2013 | Yamamoto | B60K 6/445 701/22 |
| 2013/0190958 A1* | 7/2013 | Izumi | B60W 20/20 701/22 |
| 2013/0226379 A1* | 8/2013 | Hirai | B60K 6/445 701/22 |
| 2013/0297137 A1* | 11/2013 | Fushiki | B60K 6/445 701/22 |
| 2013/0297138 A1* | 11/2013 | Fushiki | B60W 20/00 701/22 |
| 2014/0288736 A1* | 9/2014 | Martin | F02D 29/02 701/22 |
| 2015/0094892 A1* | 4/2015 | Kanehara | B60K 6/442 701/22 |
| 2015/0151759 A1* | 6/2015 | Oyama | B60K 6/445 701/22 |

* cited by examiner

HYBRID VEHICLE

INCORPORATION BY REFERENCE

The disclosure of Japanese Patent Application No. 2015-013217 filed on Jan. 27, 2015 including the specification, drawings and abstract is incorporated herein by reference in its entirety.

BACKGROUND OF THE INVENTION

1. Field of the Invention

The invention relates to control over a hybrid vehicle on which an engine including a valve position adjustment device that adjusts the opening and closing timing of an intake valve, or the like, with the use of an electric actuator is mounted.

2. Description of Related Art

Generally, in a hybrid vehicle, for example, there is known a technique for selecting any one of a plurality of traveling modes, such as a charge-depleting (CD) mode and a charge-sustaining (CS) mode. In CD mode, there are more opportunities to perform electric traveling by using mainly an electric motor. In CS mode, there are more opportunities to perform hybrid traveling by using mainly the electric motor and an engine.

For example, Japanese Patent Application Publication No. 2013-189046 (JP 2013-189046 A) describes a technique for, in a plug-in hybrid vehicle, selecting the CS mode by depressing an EV cancellation switch during electric traveling in CD mode. When the EV cancellation switch is depressed, traveling in CD mode is temporarily stopped.

An engine that is mounted on such a hybrid vehicle generally includes a valve timing adjustment device that adjusts the opening and closing timing of an intake valve, or the like.

However, in the case where the engine is started after the CS mode is selected by depressing the EV cancellation switch in CD mode, unless the opening and closing timing of the intake valve, or the like, is appropriately adjusted, exhaust emission may deteriorate or good drivability may not be obtained after a startup of the engine.

SUMMARY OF THE INVENTION

The invention provides a hybrid vehicle that appropriately adjusts the opening and closing timing of an intake valve, or the like, of an engine in the case where a cancellation of a charge depleting mode is required.

An aspect of the invention provides a hybrid vehicle. The hybrid vehicle includes: an electric motor configured to generate driving force of the vehicle; an engine including a valve timing adjustment device configured to adjust an advance amount with the use of an electric actuator, the advance amount indicating opening and closing timing of at least one of an intake valve and an exhaust valve; a catalyst provided in an exhaust passage of the engine; a controller configured to select any one of a charge depleting mode and a charge sustaining mode, the controller being configured to cause the vehicle to travel while switching between a first traveling mode and a second traveling mode in response to a traveling condition in each of the charge depleting mode and the charge sustaining mode, the first traveling mode being a mode in which the engine is stopped and the vehicle travels with the use of the electric motor, the second traveling mode being a mode in which the vehicle travels by operating the engine; and an operating member configured to receive cancellation operation to require a cancellation of the selected charge depleting mode. A threshold of power at which the traveling mode switches from the first traveling mode to the second traveling mode while the charge depleting mode is selected is larger than the threshold while the charge sustaining mode is selected. The controller is configured to, while the charge depleting mode is selected and the vehicle is traveling in the first traveling mode, when a cancellation of the selected charge depleting mode is required through the cancellation operation, control the electric actuator such that the advance amount becomes a target value that is determined on the basis of a temperature of the catalyst and a speed of the vehicle.

With this configuration, when a cancellation of the selected charge depleting mode is required through the cancellation operation, the electric actuator is controlled such that the advance amount becomes the target value that is determined on the basis of the temperature of the catalyst and the speed of the vehicle. Therefore, when the engine is started after the charge sustaining mode is selected, it is possible to start the engine in a state where the advance amount of the intake valve, or the like, is appropriately adjusted. Thus, it is possible to suppress deterioration of exhaust emission and obtain good drivability.

The controller may be configured to, when the temperature of the catalyst is lower than a first threshold, set the advance amount that is set when the speed of the vehicle is lower than a second threshold, to a value on a more retarded side than the advance amount that is set when the speed of the vehicle is higher than or equal to the second threshold.

With this configuration, when the temperature of the catalyst is lower than the first threshold and the speed of the vehicle is lower than the second threshold, the amount of exhaust gas is relatively suppressed by setting the advance amount to a relatively retarded-side value, with the result that it is possible to warm-up the catalyst while suppressing deterioration of exhaust emission. On the other hand, when the speed of the vehicle is higher than or equal to the second threshold, the output characteristic of the engine is relatively improved by setting the advance amount to a relatively advanced-side value, with the result that it is possible to obtain good drivability. Therefore, it is possible to particularly suppress deterioration of drivability, such as sluggish acceleration in a high vehicle speed range.

The controller may be configured to, when the temperature of the catalyst is lower than the first threshold, set the advance amount that is set when the speed of the vehicle is lower than the second threshold, to a value at which warm-up of the catalyst is more facilitated after a startup of the engine than the advance amount that is set when the speed of the vehicle is higher than or equal to the second threshold.

With this configuration, when the temperature of the catalyst is lower than the first threshold and the speed of the vehicle is lower than the second threshold, because the electric actuator is controlled such that the advance amount becomes an advance amount by which the catalyst is preferentially warmed up, it is possible to suppress deterioration of exhaust emission.

According to the aspect of the invention, when a cancellation of the selected charge depleting mode is required through the cancellation operation, the electric actuator is controlled such that the advance amount becomes the target value that is determined on the basis of the temperature of the catalyst and the speed of the vehicle. Therefore, when the engine is started after the charge sustaining mode is selected, it is possible to start the engine in a state where the advance amount of the intake valve, or the like, is appropriately adjusted. Thus, it is possible to suppress deterioration of exhaust emission and obtain good drivability. Therefore, it is possible to provide the hybrid vehicle that appropriately adjusts the opening and closing timing of the intake valve, or the like, of the engine in the case where a cancellation of the charge depleting mode is required.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. In the following description, like reference numerals denote the same components. The names and functions of the corresponding components are also the same. Thus, the detailed description of the corresponding components will not be repeated.

Figure 1:
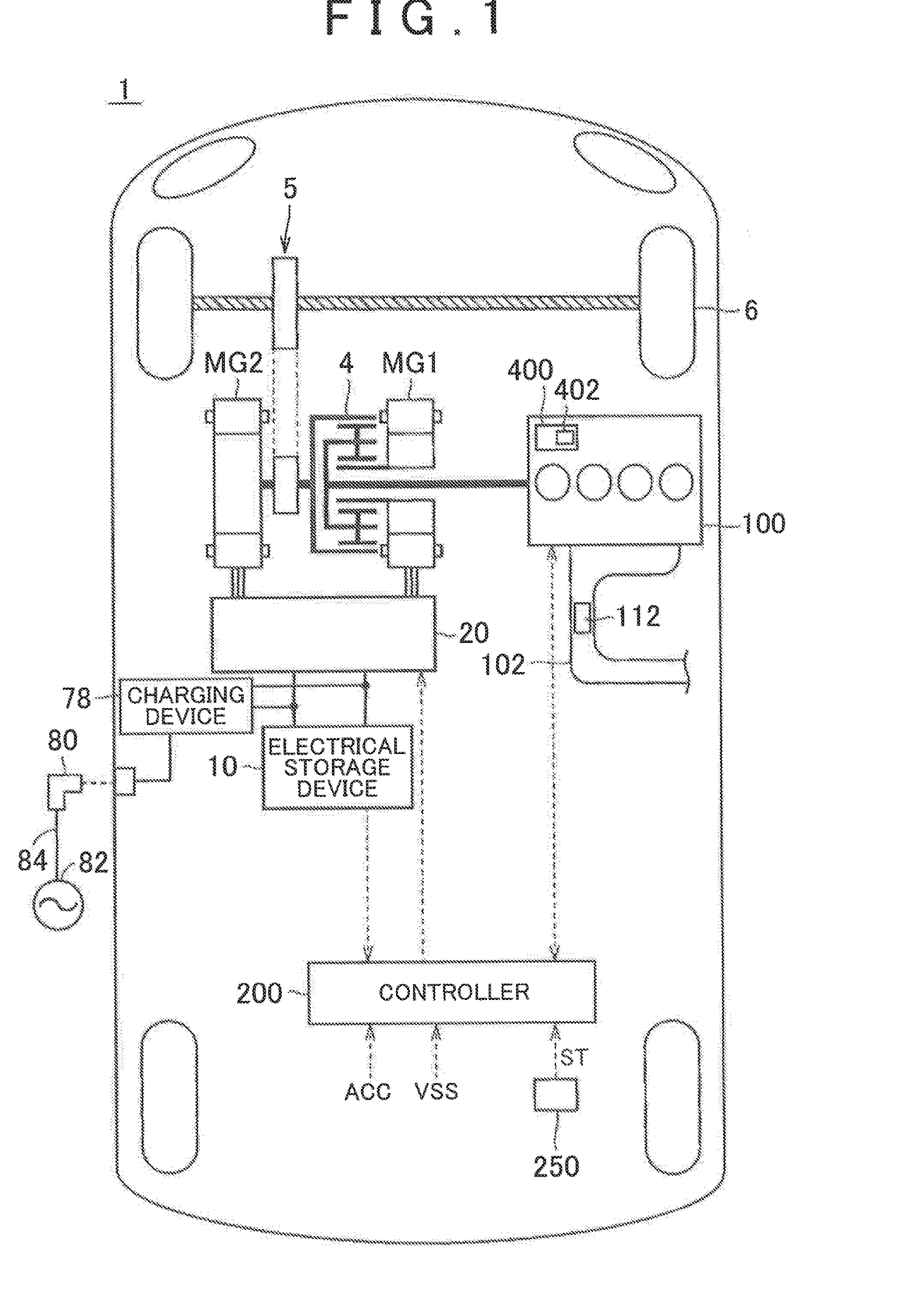
FIG. 1 is a block diagram that shows the overall configuration of a vehicle according to an embodiment.

As shown in FIG. 1, a hybrid vehicle (hereinafter, simply referred to as vehicle) 1 according to the present embodiment includes an engine 100, motor generators MG1, MG2, a power split device 4, a reduction gear 5, drive wheels 6, an electrical storage device 10, a power control unit (PCU) 20, a charging device 78, a controller 200 and an EV cancellation switch 250.

The vehicle 1 is able to travel by using driving force that is output from at least one of the engine 100 and the motor generator MG2. The engine 100 is, for example, an internal combustion engine, such as a gasoline engine and a diesel engine. The engine 100 supplies power to at least any one of the drive wheels 6 and the motor generator MG1 via the power split device 4. The motor generator MG1 is operable as a generator.

The engine 100 is able to start by being cranked by the motor generator MG1. The engine 100 includes an electric VVT device 400. The electric VVT device 400 is used to change the operation characteristic of each intake valve (specifically, the relative position of each intake valve to the rotation position (cam angle) of a camshaft) with the use of an electric actuator 402. The electric VVT device 400 is controlled by the controller 200 in response to the traveling condition of the vehicle 1 or the startability of the engine 100. A catalyst 112 is provided in an exhaust passage 102 of the engine 100.

The power split device 4 is configured to be able to split driving force, which is generated by the engine 100, into power for driving the drive wheels 6 via the reduction gear 5 and power for driving the motor generator MG1. The power split device 4 is, for example, formed of a planetary gear train. In this case, for example, the motor generator MG1 is coupled to a sun gear of the planetary gear train, the engine 100 is coupled to a carrier of the planetary gear train, the motor generator MG2 is coupled to a ring gear of the planetary gear train and the drive wheels 6 are also coupled to the ring gear of the planetary gear train via the reduction gear 5.

Each of the motor generators MG1, MG2 is an alternating-current rotary electric machine, and is, for example, a three-phase alternating-current synchronous motor generator. The motor generator MG1 is able to generate electric power by using the power of the engine 100, which is received via the power split device 4. For example, when the state of charge (SOC) of the electrical storage device 10 reaches a predetermined lower limit, the engine 100 starts, and electric power is generated by the motor generator MG1. Electric power generated by the motor generator MG1 is converted in voltage by the PCU 20, and is temporarily stored in the electrical storage device 10 or directly supplied to the motor generator MG2.

The motor generator MG2 generates the driving force of the vehicle 1 by using at least one of electric power stored in the electrical storage device 10 and electric power generated by the motor generator MG1. Driving force that is generated by the motor generator MG2 is transmitted to the drive wheels 9 via the reduction gear 5. In FIG. 1, the drive wheels 6 are front wheels; however, instead of or in addition to the front wheels, rear wheels may be driven by the motor generator MG2.

During braking of the vehicle 1, the motor generator MG2 is driven by the drive wheels 6 via the reduction gear 5, and the motor generator MG2 operates as a generator. Thus, the motor generator MG2 operates as a regenerative brake that converts braking energy to electric power. Electric power generated by the motor generator MG2 is stored in the electrical storage device 10.

The PCU 20 is a drive system for driving the motor generators MG1, MG2. The PCU 20 includes inverters, and may further include a converter. The inverters are respectively used to drive the motor generators MG1, MG2. The converter is used to convert voltage between each inverter and the electrical storage device 10.

The electrical storage device 10 is a rechargeable direct-current power supply, and, for example, includes a secondary battery, such as a nickel-metal hydride battery and a lithium ion battery. The voltage of the electrical storage device 10 is, for example, about 200 V. The electrical storage device 10 stores electric power generated by the motor generator MG1 or the motor generator MG2. A large-capacitance capacitor may also be employed as the electrical storage device 10. The electrical storage device 10 may be any electric power buffer as long as the electric power buffer is able to temporarily store electric power generated by the motor generator MG1 or the motor generator MG2 and supply the stored electric power to the motor generator MG2.

The charging device 78 charges the electrical storage device 10 with electric power that is supplied from an external power supply 82 when a charging plug 80 is attached to the vehicle 1 during a stop of the vehicle 1. The charging plug 80 is connected to one end of a charging cable 84. The other end of the charging cable 84 is connected to the external power supply 82. The positive electrode terminal of the charging device 78 is connected to a power supply line. The power supply line connects the positive electrode terminal of the PCU 20 to the positive electrode terminal of the electrical storage device 10. The negative electrode terminal of the charging device 78 is connected to a ground line. The ground line connects the negative electrode terminal of the PCU 20 to the negative electrode terminal of the electrical storage device 10. In addition to or instead of the above-described charging method, a charging method in which electric power is supplied from the external power supply 82 to the electrical storage device 10 of the vehicle 1 through contactless power supply, such as a resonance method and electromagnetic induction, may be used.

The EV cancellation switch 250 is, for example, a push switch. The EV cancellation switch 250 is connected to the controller 200. In response to driver's operation of the EV cancellation switch 250, the EV cancellation switch 250 transmits a signal ST to the controller 200.

The controller 200 includes an electronic control unit (ECU) including a central processing unit (CPU), a storage device, input/output buffers, and the like (which are not shown). The controller 200 receives signals (such as the signal ST, an accelerator operation amount ACC and a vehicle speed VSS) from the EV cancellation switch 250 and various sensors, outputs control signals to devices, and controls the devices in the hybrid vehicle 1. As main operations, the controller 200 executes traveling control over the hybrid vehicle 1 and control over the engine 100 (for example, the electric VVT device 400, and the like) in response to traveling control.

The controller 200 selects any one of a CD mode and a CS mode. In each of the CD mode and the CS mode, the controller 200 switches between a first traveling mode (in the following description, referred to as electric vehicle (EV) traveling mode) and a second traveling mode (in the following description, referred to as hybrid vehicle (HV) traveling mode) in response to a traveling condition. In first traveling mode, the engine 100 is stopped, and the vehicle 1 travels with the use of the motor generator MG2. In second traveling mode, the vehicle 1 travels by operating the engine 100.

The CD mode is a control mode in which the vehicle 1 travels by consuming electric power of the electrical storage device 10 while allowing a decrease in the SOC of the electrical storage device 10 (without keeping the SOC). The CS mode is a control mode in which the engine 100 is operated or stopped, and is a control mode in which the vehicle 1 travels while suppressing a decrease in the SOC of the electrical storage device 10 (including the case where the SOC is kept).

The controller 200 controls the PCU 20 and the engine 100 in accordance with a selected control mode.

The CD mode is not specifically limited to the mode in which the SOC is not kept. The CD mode may be, for example, a mode in which the vehicle 1 preferentially travels by consuming electric power of the electrical storage device 10 through EV traveling as compared to traveling while keeping the SOC of the electrical storage device 10. The control modes may include another control mode other than the CD mode or the CS mode. The control modes are not used only in control over the vehicle 1 during traveling of the vehicle 1. The control modes are used in control over the vehicle 1 during traveling of the vehicle 1 and during a stop of the vehicle 1.

More specifically, the controller 200 automatically switches between the CD mode and the CS mode in response to the SOC of the electrical storage device 10. For example, when the SOC of the electrical storage device 10 is higher than a switching threshold A, the controller 200 controls the PCU 20 and the engine 100 in accordance with the CD mode. When the SOC of the electrical storage device 10 is lower than the switching threshold A, the controller 200 controls the PCU 20 and the engine 100 in accordance with the CS mode. In addition, when the controller 200 receives the signal ST as a result of operation of the EV cancellation switch 250 while the CD mode is selected, the controller 200 cancels the selection of the CD mode (that is, the controller 200 switches the control mode from the CD mode to the CS mode).

Because the operation of the engine 100 for power generation is suppressed (that is, a decrease in the SOC of the electrical storage device 10 is allowed) while the vehicle 1 is traveling in accordance with the CD mode, the SOC of the electrical storage device 10 is not kept, electric power of the electrical storage device 10 is consumed with an increase in travel distance, and the SOC of the electrical storage device 10 decreases.

In CD mode, as long as a required vehicle power does not exceed a startup threshold $Pr(1)$ of the engine 100, the controller 200 controls the PCU 20 such that the vehicle 1 travels by using only the output of the motor generator MG2.

When the vehicle 1 is traveling by using only the output of the motor generator MG2 in CD mode, after the required vehicle power exceeds the startup threshold $Pr(1)$ of the engine 100 (that is, after it is determined that the required vehicle power is not satisfied by using only the output of the motor generator MG2), the controller 200 starts the engine 100 and controls the PCU 20 and the engine 100 such that the required vehicle power is satisfied by using both the output of the motor generator MG2 and the output of the engine 100. When the required vehicle power becomes lower than a stop threshold of the engine 100 in CD mode, the controller 200 stops the engine 100. The stop threshold in CD mode is a predetermined value lower than or equal to the startup threshold $Pr(1)$.

When the vehicle 1 travels in accordance with the CS mode, the operation of the engine 100 for power generation is allowed, and a decrease in the SOC of the electrical storage device 10 is suppressed by keeping the SOC of the electrical storage device 10 or recovering the SOC of the electrical storage device 10.

For example, the controller 200 may execute charge/discharge control over the electrical storage device 10 such that the SOC of the electrical storage device 10 falls within a predetermined control range (for example, a control range including the above-described switching threshold A) in CS mode or may execute charge/discharge control over the electrical storage device 10 such that the SOC of the electrical storage device 10 is kept at a predetermined target SOC (for example, the above-described switching threshold A).

In CS mode, when the SOC of the electrical storage device 10 significantly exceeds the predetermined control range or the predetermined target SOC, the controller 200 controls the PCU 20 such that the vehicle 1 travels by using only the output of the motor generator MG2 as long as the required vehicle power does not exceed a startup threshold $Pr(2)$ of the engine 100.

When the vehicle 1 is traveling by using only the output of the motor generator MG2 in CS mode as described above, after the required vehicle power exceeds the startup threshold $Pr(2)$ of the engine 100 (that is, after it is determined that the required vehicle power is not satisfied by using only the output of the motor generator MG2), the controller 200 starts the engine 100, and controls the PCU 20 and the engine 100 such that the required vehicle power is satisfied by using both the output of the motor generator MG2 and the output of the engine 100. When the required vehicle power becomes lower than a stop threshold of the engine 100 in CS mode, the controller 200 stops the engine 100. The stop threshold in CS mode is a predetermined value lower than or equal to the startup threshold Pr(2).

In the present embodiment, description will be made on the assumption that the startup threshold Pr(1) in CD mode is higher than the startup threshold Pr(2) in CS mode and the stop threshold in CD mode is higher than the stop threshold in CS mode. Each of the startup thresholds Pr(1), Pr(2) is a value lower than or equal to an upper limit value of the output of the motor generator MG2 and lower than or equal to an upper limit value (Wout) of the output of the electrical storage device 70.

Figure 2:
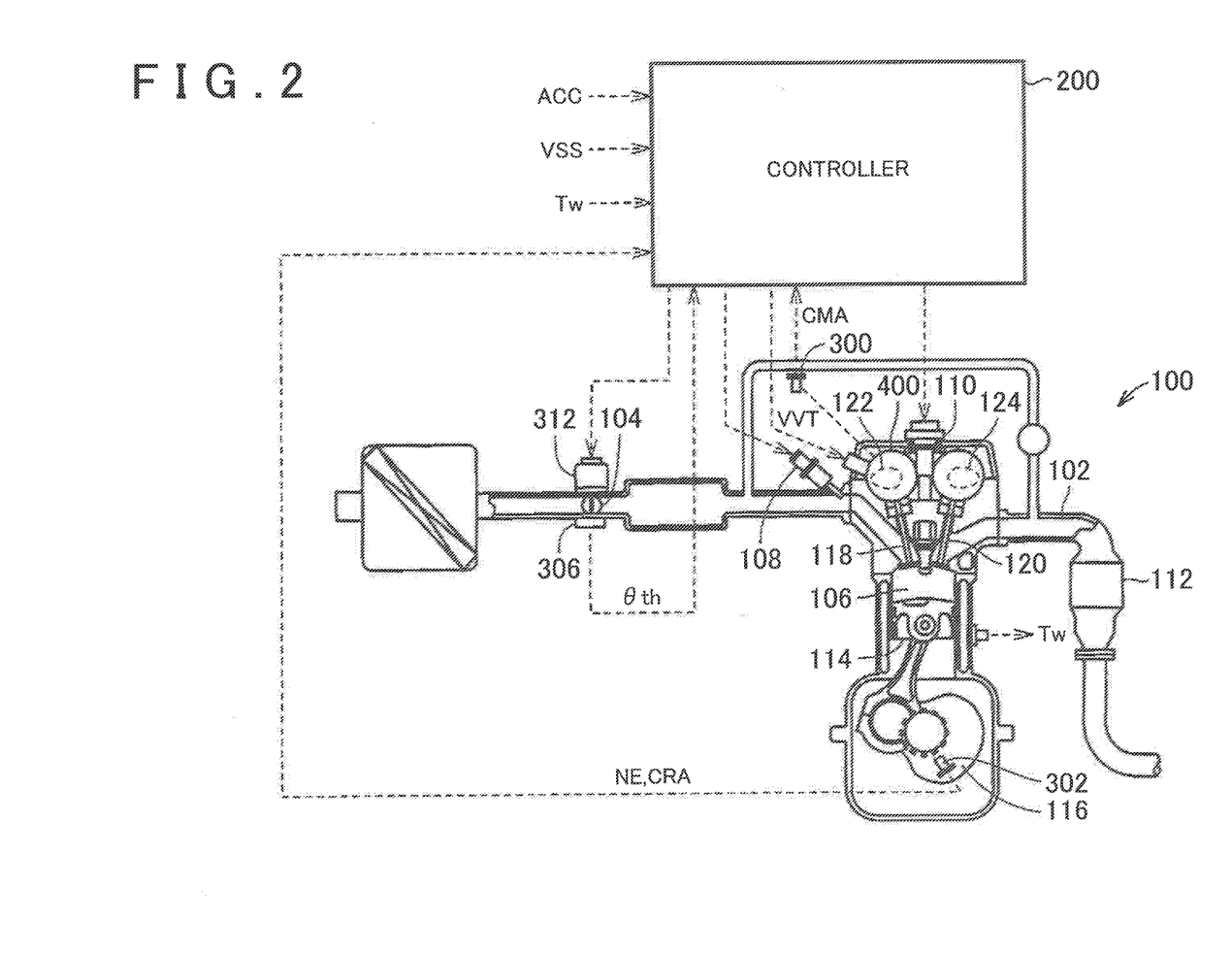
FIG. 2 is a configuration view of an engine.

Next, the configuration of the engine 100 including the electric VVT device 400 will be described. FIG. 2 is a view that shows the detailed configuration of the engine 100 shown in FIG. 1.

As shown in FIG. 2, an intake air amount to the engine 100 is adjusted by a throttle valve 104 that is driven by a throttle motor 312. Each injector 108 injects fuel toward a corresponding intake port. Fuel is mixed with air in the intake port. Air-fuel mixture is introduced into each cylinder 106 when a corresponding intake valve 118 opens. Each injector 108 may be provided as a direct injection injector that directly injects fuel into the corresponding cylinder 106. Alternatively, both the port injection injector 108 and the direct injection injector 108 may be provided.

Air-fuel mixture in each cylinder 106 is ignited by a corresponding ignition plug 110 to combust. The combusted air-fuel mixture, that is, exhaust gas, is emitted into the exhaust passage 102. The catalyst 112 is provided in the exhaust passage 102. The catalyst 112 purifies exhaust gas. Exhaust gas is purified by the catalyst 112, and is then emitted to the outside of the vehicle. A piston 114 is pushed downward by combustion of air-fuel mixture, and a crankshaft 116 rotates. Multiple types of catalysts including the catalyst 112 may be provided at different positions in the exhaust passage 102.

The intake valve 118 and an exhaust valve 120 are provided at the top portion of each cylinder 106. The amount of air that is introduced into each cylinder 106 and the timing of introduction are controlled by the corresponding intake valve 118. The amount of exhaust gas that is emitted from each cylinder 106 and the timing of emission are controlled by the corresponding exhaust valve 120. Each intake valve 118 is driven by a cam 122. Each exhaust valve 120 is driven by a cam 124.

The operation characteristic of each intake valve 118 is changed by the electric variable valve timing (VVT) device 400. The electric VVT device 400 includes camshafts, cam sprockets (which are not shown), and the electric actuator 402. Each of the camshafts is rotatably provided on a cylinder head of the engine 100 such that the direction of the rotation axis is parallel to the rotation axis of the crankshaft. The camshafts include an exhaust camshaft and an intake camshaft. The exhaust camshaft opens or closes the exhaust valve provided in each cylinder by the corresponding cam. The intake camshaft opens or closes the intake valve provided in each cylinder by the corresponding cam. The plurality of cams 124 are fixed to the exhaust camshaft at predetermined intervals. The plurality of cams 122 are fixed to the intake camshaft at predetermined intervals.

The cam sprocket is provided at one end of each of the intake and exhaust camshafts. The same timing chain is wound around both the cam sprockets. The timing chain is also wound around a timing rotor (not shown) provided on the crankshaft 116. Therefore, the crankshaft and the camshafts rotate in synchronization with each other by the timing chain.

The electric actuator 402 is provided between the intake camshaft and the corresponding sprocket. The electric actuator 402 changes the rotational phase between the intake camshaft and the cam sprocket. The operation of the electric actuator 402 is controlled on the basis of a control signal VVT that is transmitted from the controller 200. When the rotational phase between the intake camshaft and the corresponding cam sprocket is changed by the electric actuator 402, the valve opening duration of each intake valve 118 is kept, the valve opening timing of each intake valve 118 is changed, and the valve closing timing of each intake valve 118 is also changed in synchronization with the valve opening timing. Thus, the valve position of each intake valve 118 is changed with respect to the rotational position of the intake camshaft.

The mode of a change in the valve opening timing of each intake valve 118 by the electric VVT device 400 will be described later.

Not only the signals indicating the accelerator operation amount ACC and the vehicle speed VSS but also signals are input to the controller 200 from various sensors, such as a cam angle sensor 300, a crank angle sensor 302, a throttle opening degree sensor 306 and a coolant temperature sensor 308.

The cam angle sensor 300 outputs a signal indicating a cam position CMA. The crank angle sensor 302 outputs signals indicating the rotation speed (hereinafter also referred to as engine rotation speed) NE of the crankshaft 116 and the rotation angle CRA of the crankshaft 116. The throttle opening degree sensor 306 outputs a signal indicating a throttle opening degree θth. The coolant temperature sensor 308 outputs a signal indicating a coolant temperature Tw.

The controller 200 controls the engine 100 on the basis of the signals from these sensors. Specifically, the controller 200 controls the throttle opening degree θth, ignition timing, fuel injection timing, a fuel injection amount and the operation state (opening and closing timing) of each intake valve 118 such that the engine 100 is operated at a desired operating point in response to the traveling condition of the vehicle 1 and a warm-up condition of an exhaust emission control system. The operating point is the operating point of the engine 100 by which the output, torque and rotation speed of the engine 100 are determined, and the operating point of the engine 100 is determined such that the engine 100 generates desired output and torque.

The controller 200 sets a required output to the engine 100 in traveling control over the hybrid vehicle 1. The controller 200 controls the above-described parameters such that the engine 100 operates at an operating point (a combination of the engine rotation speed and the engine torque) for generating the set required output.

Figure 3:
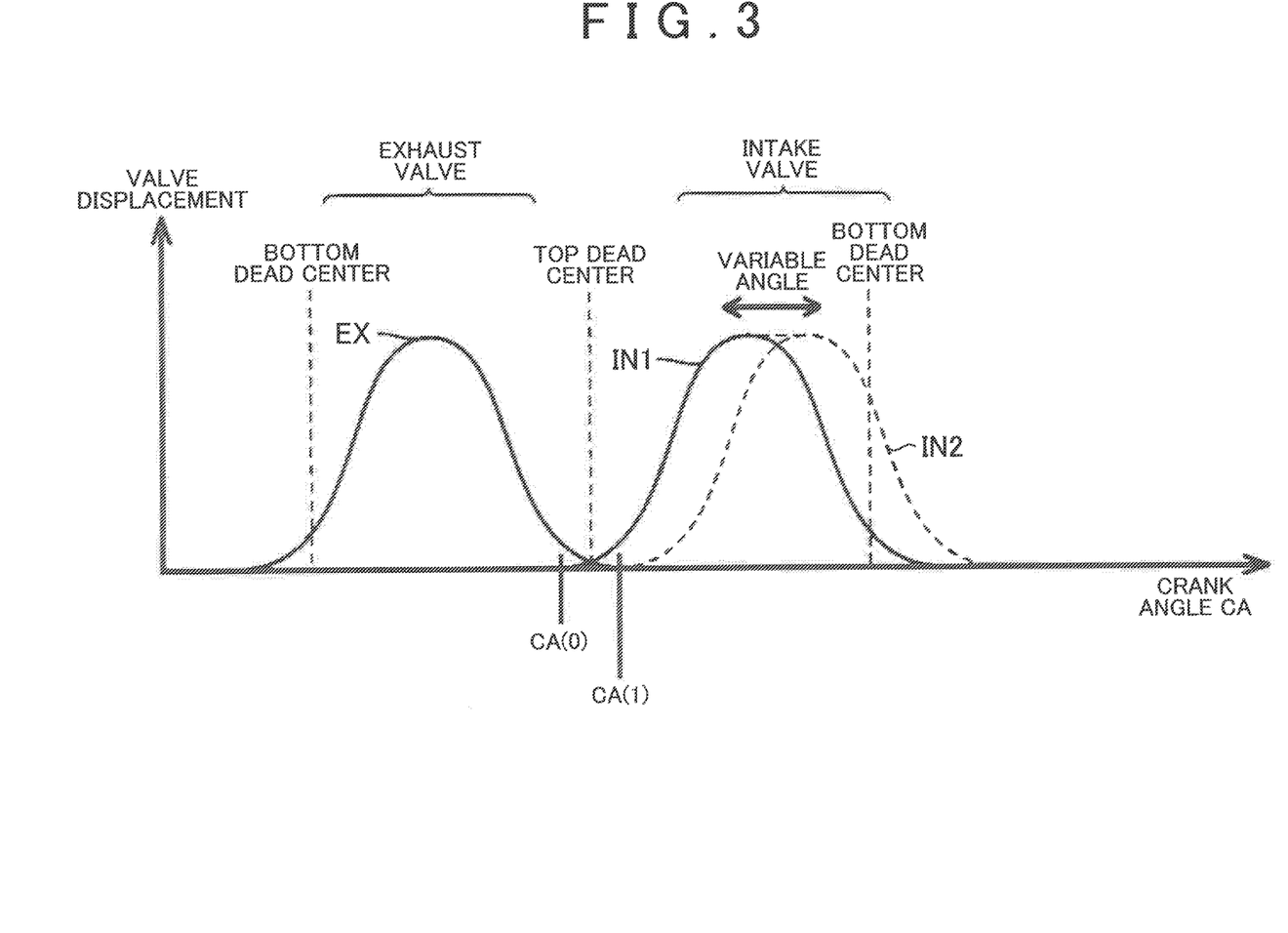
FIG. 3 is a graph that shows the relationship between a valve displacement and a crank angle, which is achieved by an electric VVT device.

FIG. 3 shows the relationship between a valve displacement and a crank angle, which is achieved by the electric VVT device 400. The ordinate axis of FIG. 3 represents valve displacement, and the abscissa axis of FIG. 3 represents crank angle.

As shown in FIG. 3, in an exhaust stroke, each exhaust valve 120 opens, the displacement of the exhaust valve 120 becomes a peak and then the exhaust valve 120 closes, and, in a following intake stroke, each intake valve 118 opens, the displacement of the intake valve 118 becomes a peak and then the intake valve 118 closes. The valve displacement of each exhaust valve 120 is indicated by a waveform EX. The valve displacement of each intake valve 118 is indicated by waveforms IN1, IN2.

The valve displacement means a displacement (opening degree) of each intake valve 118 (or each exhaust valve 120) from a state where the intake valve 118 (or the exhaust valve 120) is closed. The valve displacement at the time when the opening degree of each intake valve 118 (or each exhaust valve 120) has reached a peak is called valve lift. The range of the crank angle from when each intake valve 118 (or each exhaust valve 120) is opened to when the intake valve 118 (or the exhaust valve 120) is closed is called valve operating angle.

The electric VVT device 400 changes the valve opening timing and valve closing timing of each intake valve 118 in a state where the valve lift and the valve operating angle are kept. That is, the electric VVT device 400 changes the valve opening timing of each intake valve 118 by changing the waveform between the waveform IN1 (continuous line) and the waveform IN2 (dashed line) in a state where the shape of the waveform is kept. In the present embodiment, a crank angle CA(0) corresponds to the valve opening timing of each intake valve 118 in the case where the valve displacement is changed in accordance with the waveform IN1, and a crank angle CA(1) corresponds to the valve opening timing of each intake valve 118 in the case where the valve displacement is changed in accordance with the waveform IN2.

In the following description, changing the valve opening timing in the direction from the crank angle CA(0) to the crank angle CA(1) is termed retarding the valve opening timing, and changing the valve opening timing in the direction from the crank angle CA(1) to the crank angle CA(0) is termed advancing the valve opening timing. In the present embodiment, the crank angle CA(0) is the most advanced valve opening timing, and the crank angle CA(1) is the most retarded valve opening timing.

In the present embodiment, FIG. 3 illustrates the waveform IN1 of the valve displacement of the most advanced intake valve 118 and the waveform IN2 of the valve displacement of the most retarded intake valve 118; however, the range of change in the valve opening timing of the electric VVT device 400 is not specifically limited between CA(0) and CA(1) shown in FIG. 3. In the present embodiment, description will be made on the assumption that the valve opening timing of the most advanced intake valve 118 is set to a position at which the valve opening timing of the intake valve 118 overlaps with the valve closing timing of the exhaust valve 120; instead, CA(0) may be set such that the valve opening timing of the most advanced intake valve 118 does not overlap with the valve closing timing of the exhaust valve 120.

At the time of stopping the engine 100, the controller 200 controls the electric VVT device 400 such that the valve opening timing of each intake valve 118 becomes the most retarded valve opening timing. The electric VVT device 400 is, for example, configured such that the valve opening timing of each intake valve 118 becomes the most retarded valve opening timing when supply of electric power to the electric actuator 402 is stopped. An advance amount (described later) is a value that indicates the amount of change of the valve opening timing in the advancing direction with reference to the most retarded valve opening timing.

In the vehicle 1 having the above-described configuration, for example, when the controller 200 starts the engine 100 after the EV cancellation switch 250 is depressed in CD mode and then the CS mode is selected, unless the opening and closing timing of each intake valve 118, and the like, is appropriately adjusted, exhaust emission may deteriorate or good drivability may not be obtained after a startup of the engine 100.

In the present embodiment, in the case where the CD mode is selected and the vehicle 1 is traveling by using the motor generator MG2 while stopping the engine 100, when a cancellation of the selected CD mode is required by operating the EV cancellation switch 250, the controller 200 controls the electric actuator 402 such that the advance amount becomes a target value that is determined on the basis of the temperature of the catalyst 112 and the speed VSS of the vehicle 1.

With this configuration, when the engine 100 is started after the CS mode is selected, it is possible to start the engine 100 in a state where the advance amount of each intake valve 118, or the like, is appropriately adjusted. Thus, it is possible to suppress deterioration of exhaust emission and obtain good drivability.

Figure 4:
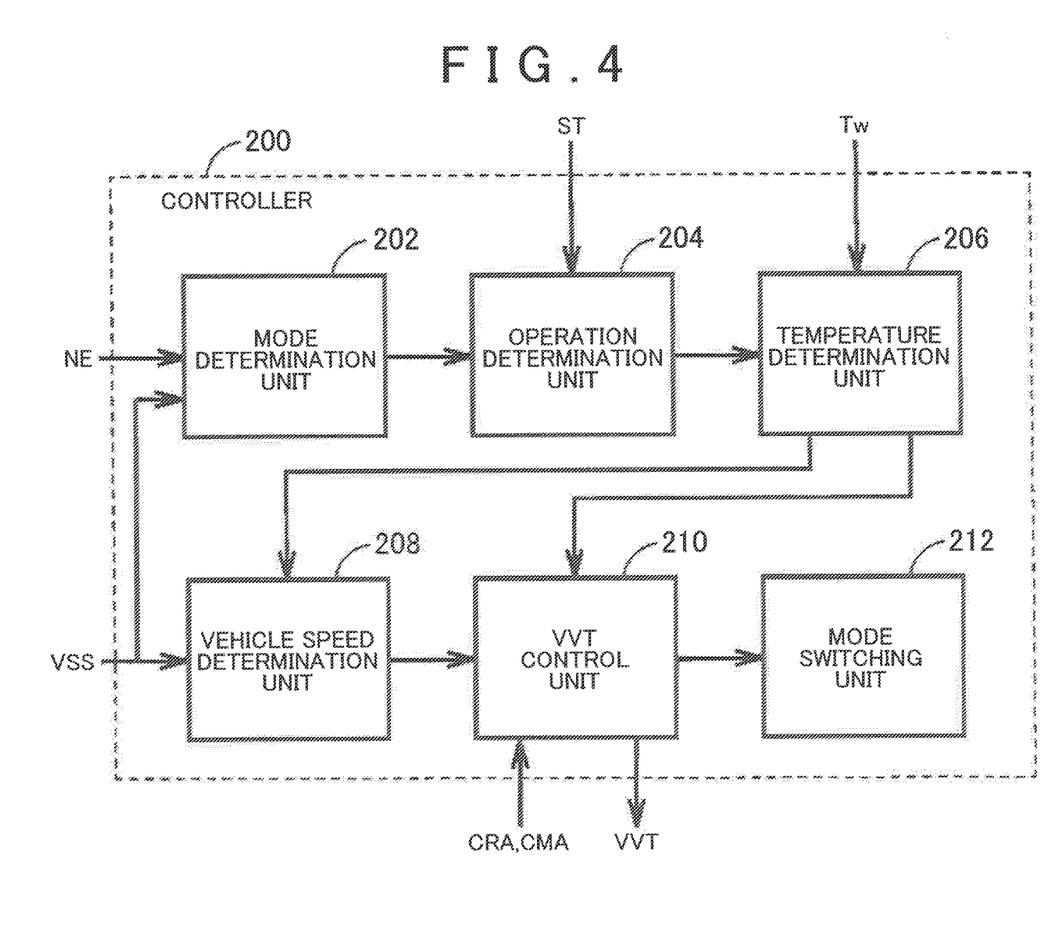
FIG. 4 is a functional block diagram of a controller.

FIG. 4 shows a functional block diagram of the controller 200 mounted on the vehicle 1 according to the present embodiment. The controller 200 includes a mode determination unit 202, an operation determination unit 204, a temperature determination unit 206, a vehicle speed determination unit 208, a VVT control unit 210 and a mode switching unit 212. These components may be implemented by software, such as programs, or may be implemented by hardware.

The mode determination unit 202 determines whether the control mode is the CD mode and the traveling mode is the EV traveling mode. The mode determination unit 202, for example, determines whether the currently selected control mode is the CD mode on the basis of the state (on state or off state) of a flag (mode determination flag) that changes each time the control mode switches.

For example, it is assumed that the mode determination flag is set to the on state when the CD mode is selected and is set to the off state when the CS mode is selected. The mode determination unit 202, for example, may determine that the CD mode is selected when the mode determination flag is in the on state and may determine that the CD mode is not selected (that is, the CS mode is selected) when the mode determination flag is in the off state.

In addition, the mode determination unit 202 may determine that the traveling mode is the EV traveling mode when the engine rotation speed NE is zero and a torque command value is being output to the motor generator MG2 or may determine that the traveling mode is the EV traveling mode when the required vehicle power is lower than the startup threshold Pr(1).

When the mode determination unit 202 determines that the traveling mode is the CD mode, the operation determination unit 204 determines whether the EV cancellation switch 250 has been operated. When the operation determination unit 204 has received the signal ST, the operation determination unit 204 determines that the EV cancellation switch 250 has been operated.

When the operation determination unit 204 determines that the EV cancellation switch 250 has been operated, the temperature determination unit 206 determines whether the temperature Tc of the catalyst 112 is higher than or equal to a threshold Tc(0). In the present embodiment, the temperature determination unit 206 estimates the temperature Tc of the catalyst 112 on the basis of the coolant temperature Tw of the engine 100. The temperature determination unit 206, for example, estimates the temperature Tc of the catalyst 112 from the current coolant temperature Tw with the use of a map, or the like, that shows the relationship between the coolant temperature Tw and the temperature Tc of the catalyst 112. The threshold Tc(0) is a predetermined value and is a lower limit value of an active temperature range of the catalyst 112. The active temperature range is, for example, a temperature range near about 400° C. The temperature determination unit 206 may estimate the temperature Tc of the catalyst 112 in consideration of, instead of or in addition to the coolant temperature Tw, for example, an intake air temperature, the heat generation amount and heat radiation amount of the engine 100, the heat radiation amount of the exhaust passage 102, an exhaust gas temperature, or the like, or may detect the temperature Tc of the catalyst 112 with the use of a temperature sensor provided at the catalyst 112.

The vehicle speed determination unit 208 determines whether the vehicle speed VSS is lower than a threshold VSS(0). The threshold VSS(0) is a predetermined value, and is an upper limit value of the vehicle speed in CD mode. The upper limit value of the vehicle speed in CD mode is an upper limit value of legal speed or a value that is adapted by design or empirically. In the present embodiment, the upper limit value of the vehicle speed in CD mode is, for example, a speed of 100 km per hour.

When the temperature determination unit 206 determines that the temperature Tc of the catalyst 112 is lower than the threshold Tc(0) and the vehicle speed determination unit 208 determines that the vehicle speed VSS is lower than the threshold VSS(0), the VVT control unit 210 actuates the electric actuator 402 of the electric VVT device 400 such that the advance amount becomes a first target value ΔCA(1) (hereinafter, this control is referred to as first VVT control). The first target value ΔCA(1) is, for example, a value on the more retarded side than a second target value ΔCA(2) (described later), and is a value at which it is possible to facilitate warm-up of the catalyst 112.

On the other hand, when the temperature determination unit 206 determines that the temperature Tc of the catalyst 112 is higher than or equal to the threshold Tc(0) or when the vehicle speed determination unit 208 determines that the vehicle speed VSS is higher than or equal to the threshold VSS(0), the VVT control unit 210 actuates the electric actuator 402 of the electric VVT device 400 such that the advance amount becomes the second target value ΔCA(2) (hereinafter, this control is referred to as second VVT control). The second target value ΔCA(2) is a value on the more advanced side than the first target value ΔCA(1), and is an advance amount at which good drivability is obtained by driving force that is transmitted from the engine 100 to the drive wheels 6. The second target value, as well as the first target value, is also a value that is adapted by design or empirically and is a predetermined value.

After any one of the first VVT control and the second VVT control is executed, the mode switching unit 212 switches the control mode from the CD mode to the CS mode. Therefore, the vehicle 1 is controlled in accordance with the CS mode.

Control processing that is executed by the controller 200 mounted on the vehicle 1 according to the present embodiment will be described with reference to FIG. 5.

In step (hereinafter, step is abbreviated as "S") 100, the controller 200 determines whether the control mode is the CD mode and the traveling mode is the EV traveling mode. When it is determined that the control mode is the CD mode and the traveling mode is the EV traveling mode (YES in S100), the process proceeds to S102. Otherwise (NO in S100), the process ends.

In S102, the controller 200 determines whether the EV cancellation switch 250 has been operated to turn on. When it is determined that the EV cancellation switch 250 has been operated to turn on (YES in S102), the process proceeds to S104. Otherwise (NO in S102), the process ends.

In S104, the controller 200 determines whether the temperature Tc of the catalyst 112 is lower than the threshold Tc(0). When it is determined that the temperature Tc of the catalyst 112 is lower than the threshold Tc(0) (YES in S104), the process proceeds to S106. Otherwise (NO in S104), the process proceeds to S110.

In S106, the controller 200 determines whether the vehicle speed VSS is lower than the threshold VSS(0). When it is determined that the vehicle speed VSS is lower than the threshold VSS(0) (YES in S106), the process proceeds to S108. Otherwise (NO in S106), the process proceeds to S110.

In S108, the controller 200 executes the first VVT control. In S110, the controller 200 executes the second VVT control. Because the details of the first VVT control and the second VVT control are described above, the detailed description thereof will not be repeated. In S112, the controller 200 switches the control mode into the CS mode. After that, the controller 200 controls the vehicle 1 in accordance with the CS mode.

The operation of the controller 200 mounted on the vehicle 1 according to the present embodiment based on the above-described structure and flowchart will be described with reference to FIG. 6.

For example, it is assumed that the control mode is the CD mode and the traveling mode is the EV traveling mode (YES in S100). At time T(0), when the EV cancellation switch 250 has been operated by a driver during traveling of the vehicle 1 (YES in S102), when the temperature Tc of the catalyst 112 is lower than the threshold Tc(0) (YES in S104) and when the vehicle speed VSS is lower than the threshold VSS(0) (YES in S106), the first VVT control is executed at time T(1) (S108).

Figure 6:
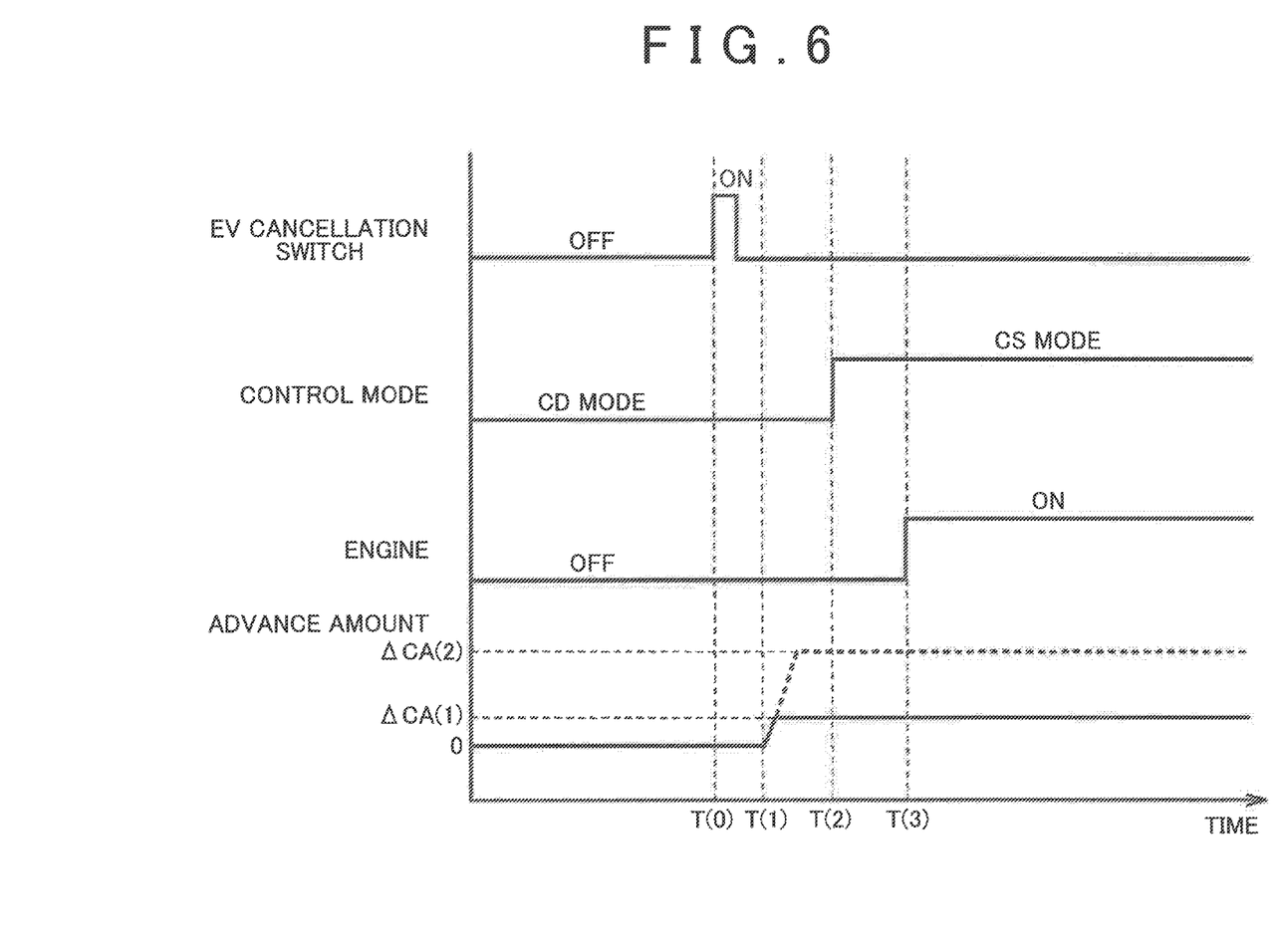
FIG. 6 is a timing chart that shows the operation of the controller.

As indicated by the continuous line of the lowermost graph in FIG. 6, when the first VVT control is executed, the electric actuator 402 is controlled such that the advance amount becomes the first target value ΔCA(1). At time T(2), the control mode is switched into the CS mode (S112). The first target value ΔCA(1) is an advance amount at which warm-up of the catalyst 112 is facilitated after a startup of the engine 100. Therefore, at time T(3), when the engine 100 is started as a result of, for example, the fact that the required vehicle power exceeds the startup threshold Pr(2) of the engine 100 while the CS mode is selected, because warm-up of the catalyst 112 is facilitated after a startup of the engine 100, deterioration of emission is suppressed.

On the other hand, at the time when the EV cancellation switch 250 has been operated, when the temperature Tc of the catalyst 112 is higher than or equal to the threshold Tc(0) (NO in S104) or when the vehicle speed VSS is higher than or equal to the threshold VSS(0) (NO in S106), the second VVT control is executed at time T(1) (S112).

Figure 5:
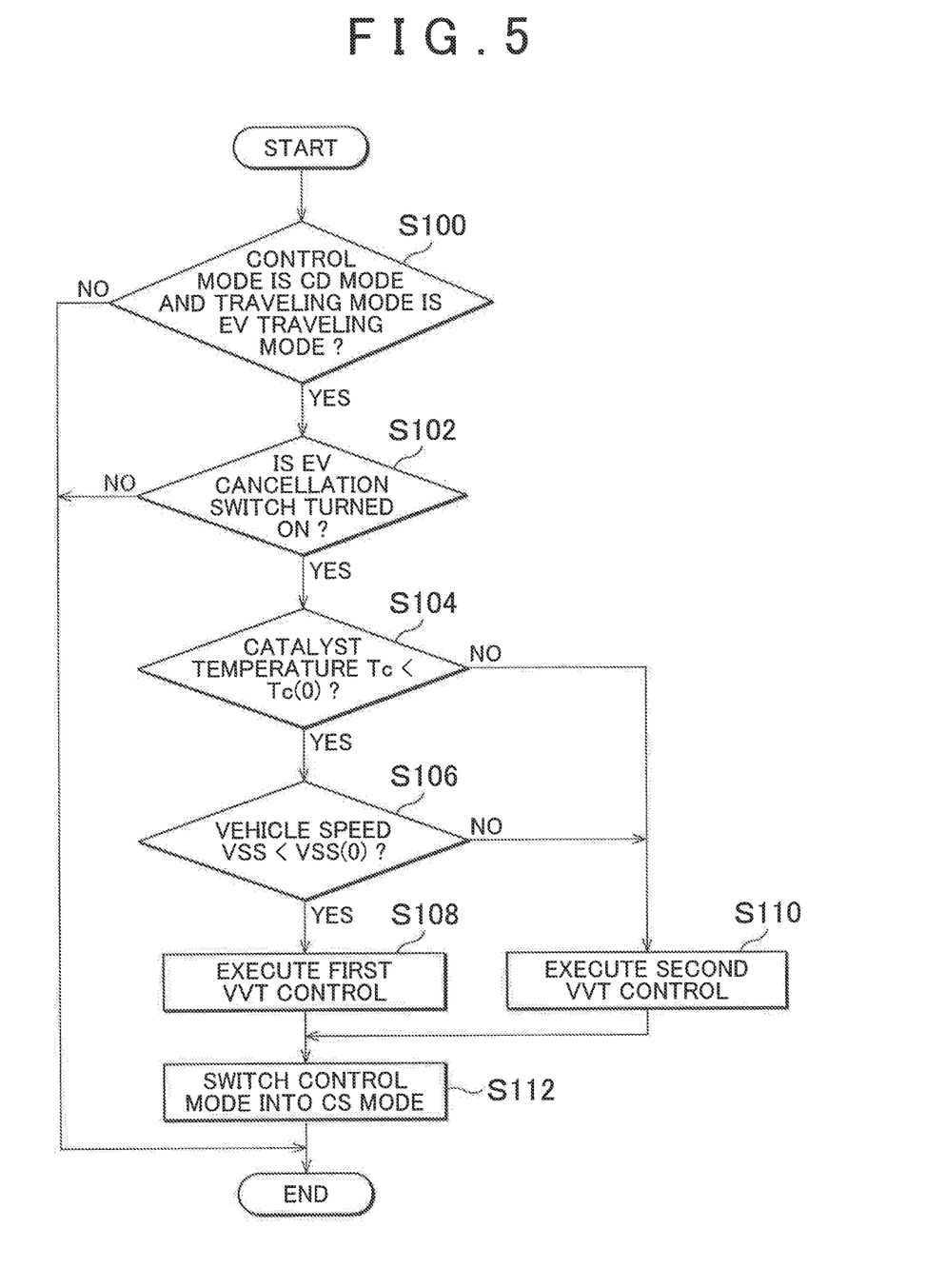
FIG. 5 is a flowchart that shows control processing that is executed by the controller.

As indicated by the dashed line of the lowermost graph in FIG. 5, when the second VVT control is executed, the electric actuator 402 is controlled such that the advance amount becomes the second target value ΔCA(2). At time T(2), the control mode is switched into the CS mode. The second target value ΔCA(2) is an advance amount at which good drivability is obtained after a startup of the engine 100. Therefore, at time T(3), when the engine 100 is started as a result of, for example, the fact that the required vehicle power exceeds the startup threshold Pr(2) of the engine 100 while the CS mode is selected, a delay, or the like, of acceleration is suppressed particularly under the condition that the vehicle speed is high, so good drivability is obtained.

As described above, when a cancellation of the selected CD mode is required by operating the EV cancellation switch 250, the electric actuator 402 is controlled such that the advance amount becomes the target value (the first target value ΔCA(1) or the second target value ΔCA(2)) that is determined on the basis of the temperature of the catalyst 112 and the speed VSS of the vehicle 1. Therefore, when the engine 100 is started after the CS mode is selected, it is possible to start the engine 100 in a state where the advance amount (opening and closing timing) of each intake valve 118, or the like, is appropriately adjusted. For example, when the temperature Tc of the catalyst 112 is lower than the threshold Tc(0) (when warm-up of the catalyst 112 is required) and when the vehicle speed VSS is lower than the threshold VSS(0) (when sluggish acceleration is not likely to occur in the case where acceleration is required), the electric actuator 402 is controlled such that the advance amount becomes the first target value ΔCA(1). Thus, warm-up of the catalyst 112 is facilitated while the amount of exhaust gas is suppressed, so it is possible to suppress deterioration of emission. When the temperature Tc of the catalyst 112 is higher than or equal to the threshold Tc(0) (when warm-up of the catalyst 112 has completed) and when the vehicle speed VSS is higher than or equal to the threshold VSS(0) (when sluggish acceleration may occur in the case where acceleration is required), the electric actuator 402 is controlled such that the advance amount becomes the second target value ΔCA(2). Thus, because it is possible to obtain high in-cylinder pressure (combustion pressure), when the engine 100 is started, the responsiveness of driving force that is transmitted from the engine 100 to the drive wheels 6 improves, with the result that good drivability is obtained. Therefore, it is possible to provide the hybrid vehicle that appropriately adjusts the opening and closing timing of each intake valve, or the like, of the engine in the case where a cancellation of the CD mode is required.

Alternative embodiments to the present embodiment will be described below. In the present embodiment, description is made on the assumption that the vehicle 1 is a plug-in hybrid vehicle that is able to be charged with the use of the external power supply 82. Instead, the invention is applicable to a hybrid vehicle having no external charging function.

In the present embodiment, description is made on the assumption that the vehicle 1 is the hybrid vehicle configured as shown in FIG. 1 as an example. However, the hybrid vehicle 1 just needs to be a hybrid vehicle in which at least the engine 100 transmits power to the drive wheels 6, and is not specifically limited to the configuration of the hybrid vehicle shown in FIG. 1.

In the present embodiment, description is made on the assumption that the advance amount of each intake valve 118 is adjusted with the use of the electric VVT device 400 when the selected CD mode is cancelled by operating the EV cancellation switch 250 while the CD mode is selected. Instead, for example, when the selected CD mode is cancelled by operating the EV cancellation switch 250 while the CD mode is selected, the advance amount of each exhaust valve 120 may be adjusted instead of or in addition to each intake valve 118 with the use of the electric VVT device 400. A target value of the advance amount of each exhaust valve 120 just needs to be set such that warm-up of the catalyst 112 is facilitated when the temperature Tc of the catalyst 112 is lower than the threshold Tc(0) and the vehicle speed VSS is lower than the threshold VSS(0); otherwise, the target value just needs to be set such that good drivability is obtained.

In the present embodiment, description is made on the assumption that the advance amount of each intake valve 118 is adjusted with the use of the electric VVT device 400 when the selected CD mode is cancelled by operating the EV cancellation switch 250 while the CD mode is selected. Instead, for example, the advance amount of each intake valve 118 may be quickly adjusted to the first target value or the second target value just after the EV cancellation switch 250 has been operated, or the advance amount of each intake valve 118 may be adjusted at a rate to such a degree that the operating sound of the electric VVT device 400 is not recognized by a driver after the EV cancellation switch 250 has been operated, or the advance amount of each intake valve 118 may be adjusted by operating the electric VVT device 400 when the vehicle speed VSS is higher than a predetermined speed at which traveling noise occurs.

In the present embodiment, description is made on the assumption that catalyst warm-up is facilitated by setting the first target value ΔCA(1) of the advance amount to a value on the more retarded side than the second target value ΔCA(2). In addition to adjustment of the advance amount, retardation of the ignition timing or control over the fuel injection amount may be additionally executed.

In the present embodiment, description is made on the assumption that the control mode is switched into the CS mode after any one of the first VVT control and the second VVT control has been executed. Instead, the control mode may be switched from the CD mode to the CS mode at the timing at which the EV cancellation switch 250 has been operated.

A combination of all or part of the above-described alternative embodiments may be implemented. The embodiment described above should be regarded as only illustrative in every respect and not restrictive. The scope of the invention is defined by the appended claims rather than the description of the above embodiment. The scope of the invention is intended to encompass all modifications within the scope of the appended claims and equivalents thereof.

What is claimed is:
1. A hybrid vehicle comprising:
an electric motor configured to generate driving force of the vehicle;
an engine including a valve timing adjustment device configured to adjust an advance amount with the use of an electric actuator, the advance amount indicating opening and closing timing of at least one of an intake valve and an exhaust valve;
a catalyst provided in an exhaust passage of the engine;
a controller configured to select any one of a charge depleting mode and a charge sustaining mode, the controller being configured to cause the vehicle to travel while switching between a first traveling mode and a second traveling mode in response to a traveling condition in each of the charge depleting mode and the charge sustaining mode, the first traveling mode being a mode in which the engine is stopped and the vehicle travels with the use of the electric motor, the second traveling mode being a mode in which the vehicle travels by operating the engine; and
an operating member configured to receive cancellation operation to require a cancellation of the selected charge depleting mode,
a threshold of power at which the traveling mode switches from the first traveling mode to the second traveling mode while the charge depleting mode is selected being larger than the threshold while the charge sustaining mode is selected, and the controller being configured to, while the charge depleting mode is selected and the vehicle is traveling in the first traveling mode, when a cancellation of the selected charge depleting mode is required through the cancellation operation, control the electric actuator such that the advance amount becomes a target value that is determined on the basis of a temperature of the catalyst and a speed of the vehicle.

2. The hybrid vehicle according to claim 1, wherein
the controller is configured to, when the temperature of the catalyst is lower than a first threshold, set the advance amount that is set when the speed of the vehicle is lower than a second threshold, to a value on a more retarded side than the advance amount that is set when the speed of the vehicle is higher than or equal to the second threshold.

3. The hybrid vehicle according to claim 2, wherein
the controller is configured to, when the temperature of the catalyst is lower than the first threshold, set the advance amount that is set when the speed of the vehicle is lower than the second threshold, to a value at which warm-up of the catalyst is more facilitated after a startup of the engine than the advance amount that is set when the speed of the vehicle is higher than or equal to the second threshold.

* * * * *